Jan. 15, 1963 J. T. WAGNER 3,073,569
BLADE MOUNTING STRUCTURE FOR A FLUID FLOW MACHINE
Filed Dec. 1, 1959
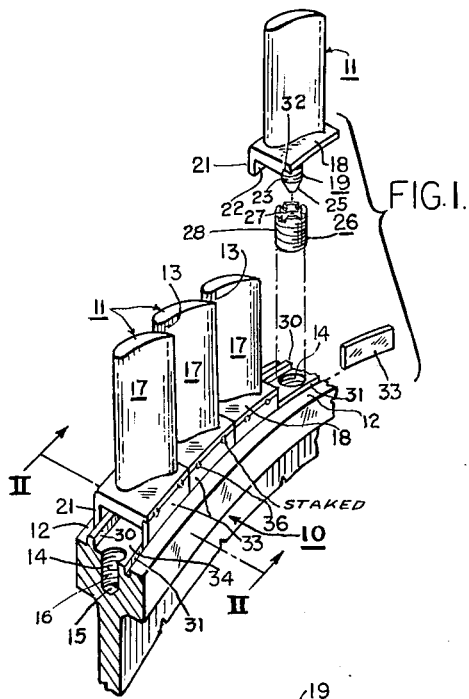
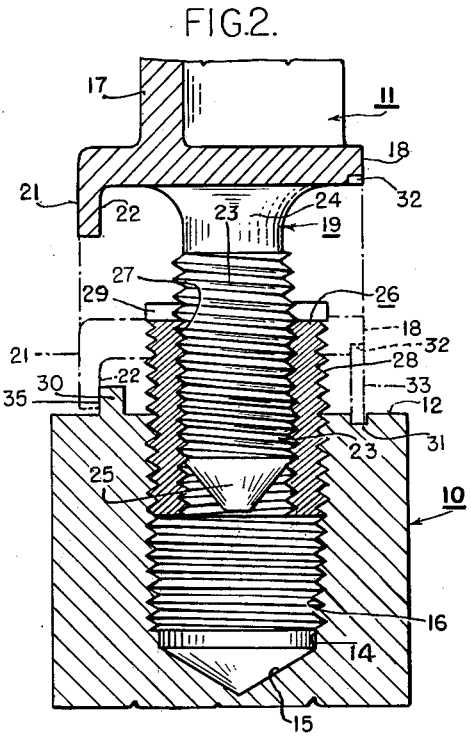
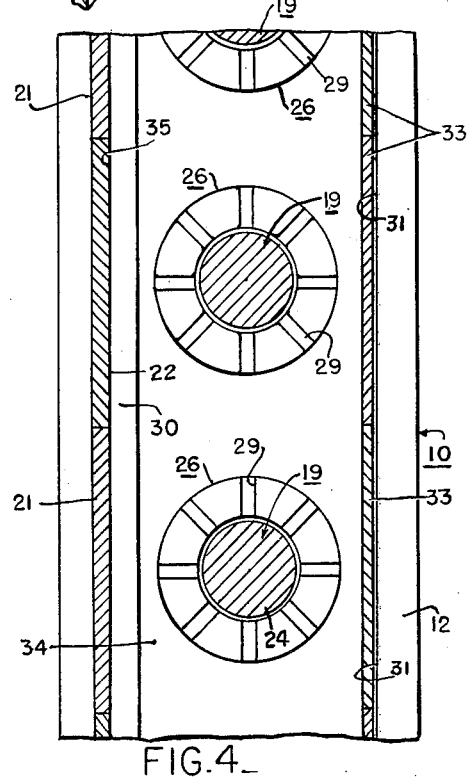
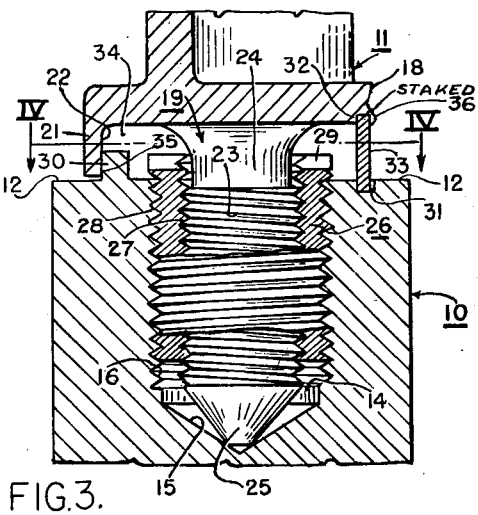
INVENTOR
JOHN T. WAGNER

United States Patent Office 3,073,569
Patented Jan. 15, 1963

3,073,569
BLADE MOUNTING STRUCTURE FOR A
FLUID FLOW MACHINE
John T. Wagner, Lansdowne, Pa., assignor to Westinghouse Electric Corporation, East Pittsburgh, Pa., a corporation of Pennsylvania
Filed Dec. 1, 1959, Ser. No. 856,580
5 Claims. (Cl. 253—77)

This invention relates to a blade mounting arrangement for an axial fluid flow machine, such as a turbine or compressor and has for an object to provide an improved arrangement of this type.

More particularly, the invention relates to an improved blade locking arrangement which permits removal and installation of an individual blade without disturbing the remaining blades in the row.

A further object is to provide a blade mounting arrangement in which a large bearing surface is readily obtainable, so that bearing stresses of a relatively low order and vibration damping characteristics of a relatively high order may be attained.

Yet another and more specific object is to provide a blade mounting structure of the above type which is readily adaptable to root and platform cooling arrangements.

Briefly, according to the invention there is provided a blade of the axial flow type having an airfoil shaped vane portion, a platform portion and an externally threaded root portion. A plurality of such blades, in accordance with the usual practice, are disposed in an annular row about the periphery of a rotor structure or the like, and jointly rotatable therewith. The rotor structure is provided with an annular array of threaded bores, extending radially, for retaining the blades. An intermediate sleeve member having internal and external threads cooperatively associated with the root portion of the associated blade and the disc bore, respectively, is provided. The internal and external threads of the sleeve member are of opposite hand. Accordingly, the threads on the root portion and bore are of opposite hand or the same hand as the associated threads on the intermediate member.

The rotor member is preferably provided with an annular peripheral flange having a plane surface portion disposed normal to the rotational axis of the rotor, while one side of the blade platform is provided with a radially inwardly extending flange having a sealing surface portion adapted to slidably engage the peripheral plane surface portion, thereby to permit axial movement of the blade during assembly but preventing relative rotation between the blade and the disc.

To mount the blade in the rotor disc, the intermediate sleeve member is first threadedly received on the root portion of the blade to a sufficient degree to maintain the two in assembled relationship. The above assembly is then disposed in registry with the bore in the root disc and the intermediate sleeve member is rotated to effect substantially full insertion of the sleeve member with the bore. Since the internal and external threads of the sleeve member are of opposite hand, as the sleeve member is rotated into engagement with the bore, the threaded root member is drawn into further engagement with the sleeve member until, in the final position, the sleeve member is substantially fully received in the bore and the root member is substantially fully received in the intermediate sleeve member.

To properly position the blade in the bore, the intermediate sleeve member may be rotated until the leading end portion of the root member abuts the bottom of the bore and arrests further movement. During such insertion, the plane surface on the platform flange slidably engages the plane surface on the disc flange to form a smooth enclosure sealing the upper portion of the root and sleeve member from motive gas flow. The sleeve member may be provided with suitable means such as notches to permit rotation by a tool, such as a spanner wrench or the like.

If desired, the opposite side of the blade platform may be provided with a seal member disposed normal to the axis of the rotor member and retained in place by any suitable means. Accordingly, the internal space bounded by the platform, the outer periphery of the rotor disc and the forward and rearward sealing portions are substantially enclosed and may be provided with any suitable coolant fluid for minimizing over heating of the adjacent rotor and blade portions.

The foregoing and other objects are effected by the invention as will be apparent from the following description and claims taken in connection with the accompanying drawing, forming a part of this application, in which:

FIG. 1 is a perspective view of a fragmentary portion of a rotor disc showing several blades in mounted relation with the rotor disc and one of the blades and associated structure in exploded relation relative the disc;

FIG. 2 is a transverse section, on a considerably larger scale, taken on line II—II of FIG. 1, with the components in partially assembled relationship;

FIG. 3 is a sectional view similar to FIG. 2 but with the components in completely assembled relationship; and FIG. 4 is a transverse section taken on line IV—IV of FIG. 3.

Referring to the drawing in detail, especially FIG. 1, there is shown a rotor disc member 10 for an axial fluid flow utilizing machine such as a compressor or a turbine, having mounted thereon a plurality of airfoil shaped blades 11. Although only a fragment of the rotor disc member 10 has been shown for simplicity of illustration, the rotor disc member 10 forms a complete circle having a circular peripheral portion 12 supporting a complete annular row of blades 11 mounted thereon. Also, the rotor disc member 10 is rotatable about its central axis (not shown).

The blades 11 are disposed in closely spaced relation with each other to form a plurality of gas flow passages 13 through which the elastic fluid flows during operation.

Referring now more particularly to FIGS. 2 and 3, since the blade mounting structure for each of the blades 11 may be substantially identical, only one of the blade mounting structures will be described in detail, it being understood that the remaining blade mounting structures may be similarly arranged. The rotor disc member 10 is provided with a radially disposed bore 14 extending inwardly from the outer periphery 12 and having bottom surface portion 15. The bore 14 is provided with a helical screw thread 16 extending substantially for the entire length of the bore.

The blade 11 is provided with a vane portion 17 of substantially airfoil shape integrally formed with a platform 18 of substantially rectangular or other polygonal shape and an integral root portion 19 extending radially inwardly therefrom. The platform 18 and the root portion 19 are disposed substantially normal to each other and the forward side of the platform 18 is provided with a depending sealing flange portion 21 extending co-extensively therewith and having a plane surface portion 22 disposed normal to the axis of the disc member 10 and parallel to the axis of the root portion 19.

The root portion 19 is provided with a helical screw thread 23 and has an upper cylindrical portion 24 of somewhat smaller diameter than the root diameter of the screw thread 23 to provide frictional relief and avoid stress concentration from the threads, as well known in the art. The end portion 25 of the root portion 19 may be substantially frusto-conical in shape.

An intermediate sleeve member 26 of generally the same length as the bore 14 is provided with an internal helical screw thread 27 and an external helical screw thread 28. The internal helical screw thread 27 is of opposite hand with relation to the external helical screw thread 28 and the sleeve member is so proportioned that the helical screw thread 23 of the blade root portion 19 is snugly received therein while the helical screw thread 28 is snugly received in the helical screw thread 16 of the bore.

The upper end portion of the intermediate sleeve member 26 is provided with a plurality of circumferentially spaced notches 29 or the like, adapted to receive a manually operated tool such as a spanner wrench, thereby to facilitate screwing of the sleeve member into or out of the bore 14.

The disc member 10 is further provided with a radially outwardly extending peripheral sealing flange portion 30 on its forward side, while on its rearward side it is provided with an annular recess 31. The recess 31 is disposed in radial alignment with a rabbet 32 formed on the blade platform 18. As best shown in FIG. 3, the recess 31 and the rabbet 32 are arranged to receive a sealing plate member 33 of generally arcuate shape and corresponding to the curvature of the disc member 10.

As best shown in FIG. 3, the blade platform 18, the disc periphery 12 and the sealing flanges 21 and 30 cooperate with the sealing plate member 33 to define an annular space 34 encompassing the disc member 10. If desired, suitable coolant fluid such as air may be admitted to the space 34, in any desired manner (not shown) to effect cooling of the associated components of the disc member 10 and the blade members 11.

To assemble the blade 11 to the disc member 10, the intermediate sleeve member 26 is first partially threaded onto the root portion 19 of the blade and then held in registry with the bore 14 while the intermediate sleeve member 26 is rotated into threaded engagement with the threads 16 of the bore. As mentioned earlier, the intermediate sleeve member may be easily screwed into position by a spanner wrench or the like, engaging the notches 29. During such assembly, as indicated in solid lines in FIG. 2, the blade 11 is manually held against rotation while disposed in such a manner that the plane surface portion 22 of its sealing flange 21 is disposed in alignment with the plane surface portion 22 of its sealing flange 21 is disposed in alignment with the plane surface 35 of the disc flange 30. As the intermediate sleeve member 26 is thus rotated with the blade held against rotation, the sleeve member 26 will be drawn into more complete engagement with the bore 14 and, concomitantly therewith, the root portion 19 will be drawn into more complete engagement with the sleeve member. As the degree of engagement between the sleeve member and the bore and the root portion and the sleeve progresses to the point at which the plane surface 22 of the blade flange 21 engages the disc flange plane surfaces 35, the blade 11 is inherently held against rotation by sliding engagement of the surface. Further rotation of the sleeve member will be effective to draw the blade 11 radially inwardly until the end portion 25 of the root portion 19 strikes the bottom surface 15 of the bore, and/or the flange 21 strikes the peripheral surface 12, thereby arresting further radially inward movement of the blade as well as the sleeve member. The sleeve member may then be further rotated to a slight degree with additional torque to tighten the assembly and staked (not shown), to minimize the possibility of loosening during operation.

After the blade is thus mounted in the disc member, the sealing plate member 33 is affixed to the disc and blade platform 18 as shown in FIG. 3 and held against dislodgment by staking or upsetting some of the adjacent metal from the blade platform 18 as indicated by the reference numeral 36 in FIGS. 1 and 3.

The remaining blades 11 may be mounted to the disc member 12 in a substantially similar manner to that described above and are thus effective to provide a complete annular row of blades in which the platforms 18, sealing plate members 33 and the platform flanges 21 are disposed in end-to-end abutment, thereby to provide the annular space 34 previously described.

During operation of the thus described rotor disc and blade structure, motive gases will flow through the passages 13 between adjacent blades in a plurality of streams. The efficiency of the gas flow streams is enhanced by the smooth contours of the platform flanges 21 acting on the incoming gas streams, as well as the smooth contour of the sealing plate members 33 on the outgoing gas streams.

To remove a single blade during overhauling procedure, the sealing plate member 33 of the selected blade is first pried loose from its staking 36, in any desirable manner, thereby providing access to the notches 29 of the intermediate sleeve member 26, whereupon a spanner wrench may be applied to the notches 29 to rotate the intermediate sleeve member 26 out of the bore 14. After the initial blade is removed, the subsequent adjacent blades may be removed by inserting the spanner wrench through the opening afforded by removal of the first blade. If the thus removed blade can be repaired and rendered serviceable, it may be replaced in substantially the same manner as a new blade by following the procedure previously described and upsetting metal from the blade platform 18 at points previously undisturbed by the original staking operation. Accordingly, it will now be understood that a blade may be removed and replaced numerous times, if otherwise serviceable.

It will now be seen that the invention provides a highly improved blade mounting structure for an axial fluid flow machine, which mounting structure involves relatively few components which are easily fabricated by mass production methods and which may be easily assembled or disassembled from the rotor disc member 10.

Since the threaded engagement between the root portion 19 and the sleeve member 26 as well as the threaded engagement between the sleeve member 26 and the disc bore 14 provides a relatively large bearing surface, the bearing stresses imposed during operation on the rotor portion, is of a relatively small order. An attendant advantage accruing from this arrangement is the relatively high blade vibration damping characteristics provided by the root portion 19, the flange 21 and the sealing plate 33.

This arrangement facilitates assembly and/or disassembly of the blades from the rotor disc, since the blades need not be rotated into threaded engagement with rotor disc 10. In bladed rotor discs of the type described, the blade passages 13 are of insufficient width to permit rotation of the blades and even though sufficient spacing could be provided in some instances, the optimum platform shape (rectangular) would have to be modified to permit such rotation.

While the invention has been shown in but one form, it will be obvious to those skilled in the art that it is not so limited, but is susceptible of various changes and modifications without departing from the spirit thereof.

What is claimed is:

1. A blade mounting structure for an axial fluid flow machine comprising a support member having a circular periphery, said periphery having a threaded bore, said bore being closed at one end by a bottom surface portion, a blade member having an externally threaded root portion, and an intermediate sleeve member provided with internal and external threaded portions, said root portion being threadedly received in the internal threaded portion of said sleeve member and said sleeve member being threadedly received in said bore, means provided on said sleeve member for rotating the latter into and out of joint engagement with said root portion and said bore, jointly cooperative portions on said support member and said blade member preventing relative rotation between said support member and said blade member during rotation of said sleeve member, said internal and external threaded portions of said sleeve member being provided with screw threads of opposite hand to permit such joint engagement and disengagement.

2. A blade mounting structure for an axial fluid flow machine comprising a circular support member having a peripheral portion, said peripheral portion having a radially extending threaded bore, said bore being closed at one end by a bottom surface portion, a blade member having a platform and an externally threaded root portion, and an intermediate sleeve member provided with internal and external threaded portions, said root portion being threadedly received in the internal threaded portion of said sleeve member and said sleeve member being threadedly received in said bore, means provided on said sleeve member for rotating the latter into and out of joint engagement with said root portion and said bore, jointly cooperative surface portions on said peripheral portion and said blade platform permitting axial movement of said blade but preventing rotative movement during rotation of said sleeve member, said internal and external threaded portions of said sleeve member being provided with screw threads of opposite hand to permit such joint engagement and disengagement.

3. In combination: a rotor structure for an axial fluid flow machine comprising a circular rotor member having an annular row of radially extending blades disposed on its circular periphery; said rotor member having a radially disposed screw-threaded bore provided in its circular periphery and a first plane surface portion disposed parallel to the axis of said bore; one of said blades having a vane portion, a platform portion and a screw-threaded root portion, said platform having a second plane surface portion disposed parallel to the axis of said root portion; and an intermediate sleeve member provided with internal and external screw-threaded portions; said root portion being threadedly received in said sleeve member and said sleeve member being threadedly received in said bore, said first and second plane surface portions slidably engaging each other and preventing rotation of said blade relative to said rotor member, and the internal and external screw-threads of said sleeve member being of opposite hand.

4. In combination: a rotor structure for an axial fluid flow machine comprising a circular rotor member having an annular row of radially extending blades disposed on its circular periphery; said rotor member having a radially disposed screw-threaded bore provided in its circular periphery, said bore being closed at one end by a bottom surface portion, and a first plane surface portion disposed normal to the axis of said rotor member; one of said blades having a vane portion, a platform portion and a screw-threaded root portion, said platform having a second plane surface portion formed coextensively therewith and disposed parallel to the axis of said root portion; and an intermediate sleeve member provided with internal and external screw-threaded portions; said root portion being threadedly received in said sleeve member and said sleeve member being threadedly received in said bore, means for rotating said sleeve member into and out of engagement with said bore, said first and second plane surface portions slidably engaging each other and permitting axial movement of said blade but preventing rotation of said blade relative to said rotor member, the internal and external screw-threads of said sleeve member being of opposite hand, and a plate member secured in a plane normal to the axis of said rotor member and extending from said platform to the circular periphery of said rotor member.

5. In combination, a rotor structure for an axial fluid flow machine comprising a rotor disc having an annular row of radially extending blades disposed on its circular periphery; said rotor disc having a radially disposed screw-threaded bore provided in its circular periphery and a first plane surface portion disposed normal to the axis of said disc and encompassing said disc; one of said blades having a vane portion, a platform portion and a screw-threaded root portion, said platform having a second plane surface portion disposed on one side thereof parallel to the axis of said root portion; and an intermediate sleeve member provided with internal and external screw-threaded portions; said root portion being threadedly received in said sleeve member and said sleeve member being threadedly received in said bore, means for rotating said sleeve member into and out of engagement with said bore, said first and second plane surface portions slidably engaging each other but preventing rotation of said blade relative to said rotor member, and the internal and external screw-threads of said sleeve member being of opposite hand, and a plate member secured in a plane parallel to said second plane surface portion and disposed on the opposite side of said platform, said plate member extending from said platform to said disc.

References Cited in the file of this patent

UNITED STATES PATENTS

| 633,376 | Davies | Sept. 19, 1899 |
| 808,027 | Eager | Dec. 19, 1905 |
| 1,997,671 | Arnold | Apr. 16, 1935 |

FOREIGN PATENTS

| 485,841 | Great Britain | May 25, 1938 |
| 551,236 | Great Britain | Feb. 12, 1943 |